United States Patent
Mittal et al.

(10) Patent No.: US 10,114,443 B2
(45) Date of Patent: Oct. 30, 2018

(54) THERMAL MITIGATION OF MULTI-CORE PROCESSOR

(71) Applicant: QUALCOMM Incorporated, San Diego, CA (US)

(72) Inventors: Rajat Mittal, San Francisco, CA (US); Madan Krishnappa, San Diego, CA (US); Rajit Chandra, Cupertino, CA (US); Mohammad Tamjidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/441,124

(22) Filed: Feb. 23, 2017

(65) Prior Publication Data

US 2017/0160785 A1    Jun. 8, 2017

Related U.S. Application Data

(63) Continuation of application No. 14/675,409, filed on Mar. 31, 2015, now Pat. No. 9,582,052.

(Continued)

(51) Int. Cl.
*G06F 1/32*    (2006.01)
*G06F 1/20*    (2006.01)
(Continued)

(52) U.S. Cl.
CPC .............. *G06F 1/324* (2013.01); *G06F 1/206* (2013.01); *G06F 1/3203* (2013.01);
(Continued)

(58) Field of Classification Search
CPC ........ G06F 1/206; G06F 1/3206; G06F 1/324; G06F 1/3287; G06F 1/329; G06F 9/4856; G06F 9/5088; G06F 9/5094
See application file for complete search history.

(56) References Cited

U.S. PATENT DOCUMENTS

| 7,263,457 | B2 | 8/2007 | White et al. |
| 7,783,903 | B2 | 8/2010 | Piazza |

(Continued)

OTHER PUBLICATIONS

Reda S., at al., "Adaptive Power Capping for Servers with Multithreaded Workloads", IEEE Micro, IEEE Service Center, Los Alamitos, CA, US, vol. 32, No. 5, XP011470383, Sep. 1, 2012 (Sep. 1, 2012), pp. 64-75.

(Continued)

*Primary Examiner* — Mark A Connolly
(74) *Attorney, Agent, or Firm* — Arent Fox LLP

(57) ABSTRACT

A thermal controller for managing thermal energy of a multi-core processor is provided. The cores include a first core processing a load and remaining cores. The thermal controller is configured to determine that a temperature of the first core is greater than a first threshold, determine a temperature of a second core of the remaining cores in response to determining that the temperature of the first core is greater than the first threshold, and determine whether the temperature of the second core is greater than or less than a second threshold. The thermal controller is configured to transfer at least a portion of the load of the first core to the second core in response to determining that the temperature of the first core is greater than the first threshold and based on whether the temperature of the second core is greater than or less than the second threshold.

28 Claims, 6 Drawing Sheets

Related U.S. Application Data

(60) Provisional application No. 62/072,975, filed on Oct. 30, 2014.

(51) Int. Cl.
*G06F 9/50* (2006.01)
*G06F 9/48* (2006.01)

(52) U.S. Cl.
CPC ............ *G06F 1/3206* (2013.01); *G06F 1/329* (2013.01); *G06F 1/3287* (2013.01); *G06F 1/3296* (2013.01); *G06F 9/4856* (2013.01); *G06F 9/5088* (2013.01); *G06F 9/5094* (2013.01); *Y02D 10/126* (2018.01); *Y02D 10/16* (2018.01); *Y02D 10/171* (2018.01); *Y02D 10/172* (2018.01); *Y02D 10/22* (2018.01); *Y02D 10/24* (2018.01); *Y02D 10/32* (2018.01)

(56) References Cited

U.S. PATENT DOCUMENTS

| | | | |
|---|---|---|---|
| 7,886,172 | B2 | 2/2011 | Bose et al. |
| 7,934,110 | B2 | 4/2011 | Finkelstein et al. |
| 8,037,445 | B2 | 10/2011 | Poirier et al. |
| 8,904,204 | B2 | 12/2014 | Fletcher et al. |
| 9,037,882 | B2 | 5/2015 | Vadakkanmaruveedu et al. |
| 2002/0087903 | A1 | 7/2002 | Hermerding et al. |
| 2008/0005591 | A1 | 1/2008 | Trautman et al. |
| 2009/0094438 | A1 | 4/2009 | Chakraborty et al. |
| 2011/0138395 | A1 | 6/2011 | Wolfe |
| 2011/0213934 | A1 | 9/2011 | Greenhalgh et al. |
| 2012/0223764 | A1 | 9/2012 | Allen-Ware et al. |
| 2012/0271481 | A1 | 10/2012 | Anderson et al. |
| 2014/0173311 | A1 | 6/2014 | Park et al. |
| 2014/0240031 | A1 | 8/2014 | Vadakkanmaruveedu et al. |
| 2015/0006925 | A1 | 1/2015 | Branover et al. |
| 2015/0106640 | A1 | 4/2015 | Brackman et al. |
| 2016/0124476 | A1 | 5/2016 | Mittal |

OTHER PUBLICATIONS

Hanumaiah V., et al., "Maximizing Performance of Thermally Constrained Multi-core Processors by Dynamic Voltage and Frequency Control," IEEE/ACM International Conference on Computer-Aided Design—Digest of Technical Papers (ICCAD), 2009, pp. 310-313.

International Search Report and Written Opinion—PCT/US2015/054048—ISA/EPO—dated Jan. 25, 2016.

Salami B., et al., "Physical-Aware Task Migration Algorithm for Dynamic Thermal Management of SMT Multi-Core Processors", 2014 19th Asia and South Pacific Design Automation Conference (ASP-DAC), IEEE, Jan. 20, 2014, XP032570079, pp. 292-297, DOI: 10.1109/ASPDAC.2014.6742905 [retrieved on Feb. 18, 2014].

Yeo I., et al., "Predictive Dynamic Thermal Management for Multicore Systems", 2008 45th ACM/IEEE Design Automation Conference: [DAC 2008]; Anaheim, CA, Jun. 8-13, 2008, IEEE, Piscataway, NJ, USA, Jun. 8, 2008 (Jun. 8, 2008), XP031280997, pp. 734-739, ISBN: 978-1-60558-115-6.

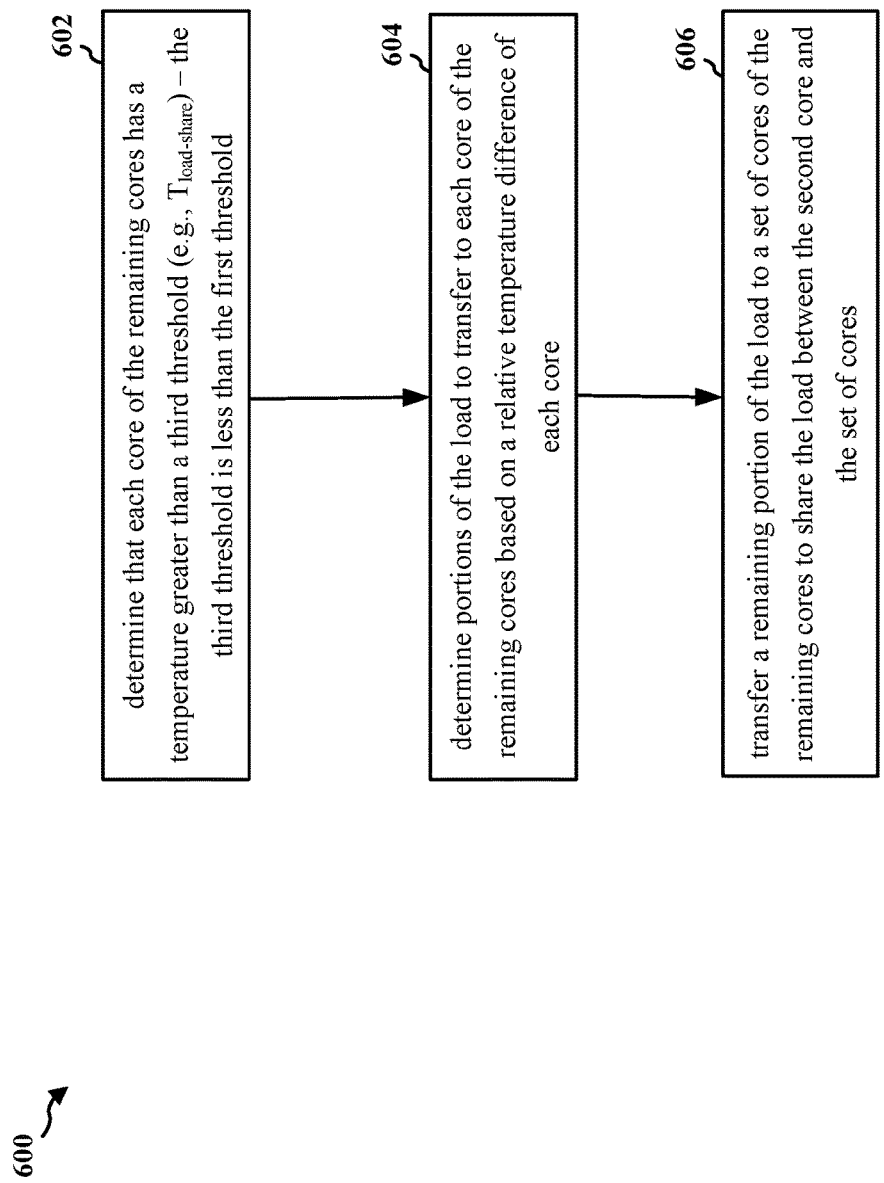

… … …

THERMAL MITIGATION OF MULTI-CORE PROCESSOR

CROSS-REFERENCE TO RELATED APPLICATION(S)

This application is a continuation of U.S. application Ser. No. 14/675,409 entitled "THERMAL MITIGATION OF MULTI-CORE PROCESSOR" and filed on Mar. 31, 2015, which claims the benefit of U.S. Provisional Application Ser. No. 62/072,975, entitled "THERMAL MITIGATION OF MULTI-CORE PROCESSOR" and filed on Oct. 30, 2014, which is expressly incorporated by reference herein in its entirety.

BACKGROUND

Field

The present disclosure relates generally to a user equipment (UE), and more particularly, to techniques of thermal mitigation of a multi-core processor on a UE.

Background

A UE may utilize a processor having multiple cores. UEs include portable computing devices ("PCDs") such as cellular telephones, portable digital assistants ("PDAs"), portable game consoles, palmtop computers, and other portable electronic devices. Some smaller UEs may not have active cooling devices, e.g., fans, which are often found in larger UEs such as laptop and desktop computers. Accordingly, there is a need for effectively mitigating heat generated by one or more cores of the processor of a UE.

SUMMARY

In an aspect of the disclosure, a method, a computer program product, and an apparatus are provided. The apparatus may be a UE. The UE has a processor including a plurality of cores. The plurality of cores includes a first core and remaining cores. The UE determines a temperature of the first core of the plurality of cores. The first core processes a load. The UE determines that the temperature of the first core is greater than a first threshold. The UE determines that the temperature of the first core is not greater than a second threshold. The second threshold is greater than the first threshold. The UE transfers at least a portion of the load of the first core to a second core of the remaining cores in response to determining that the temperature of the first core is greater than the first threshold.

BRIEF DESCRIPTION OF THE DRAWINGS

FIG. 6 is a diagram illustrating a thermal mitigation procedure of a UE for sharing a load among cores of a processor.

DETAILED DESCRIPTION

Figure 1:
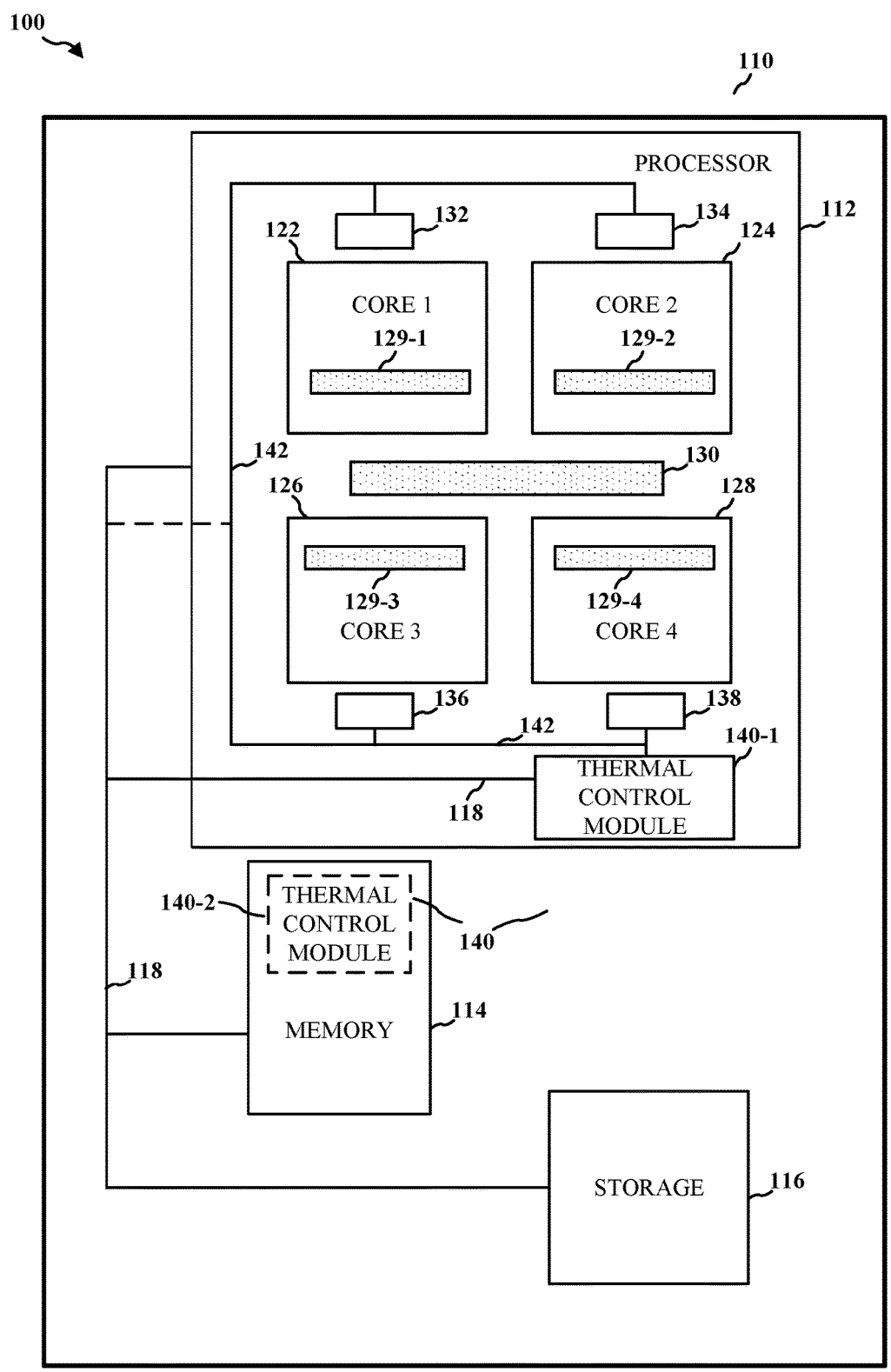
FIG. 1 is a functional block diagram illustrating an exemplary embodiment of a UE.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Apparatuses and methods will be described in the following detailed description and may be illustrated in the accompanying drawings by various blocks, modules, components, circuits, steps, processes, algorithms, elements, etc.

Several aspects of a UE will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

Performance demand in PCDs and other UEs is increasing. As a result, the number of cores on a processor of a PCD has increased. The available power (power budget), however, may be limited due to the limited form factor of these devices. When all of the cores are utilized, the performance of the processor is limited by the power budget. To maintain reliability of a PCD, it is beneficial to keep temperature(s) of the processor/core(s) below a mitigation temperature threshold. When the mitigation temperature threshold is reached, the PCD may execute a thermal mitigation procedure that reduces the performance of the processor/core(s) in order to control the temperature(s) of the processor/core(s). It is further beneficial to operate the processor/core(s) under the mitigation temperature threshold for a longer time period to avoid compromising the performance of the processor/core(s).

In some configurations, the implemented mitigation procedures reduce the processor performance to decrease the temperature of the processor. For example, when the temperature of a core reaches the mitigation temperature threshold, the processing frequency and/or the supply voltage of the core may be decreased to reduce power consumption and, hence, the temperature of the core. A reduction in frequency/voltage may lead to a reduction in performance.

On the other hand, the applications running on a PCD may be single/dual core intensive. Thus, the addition of more cores to the processor may not directly translate into improved performance. Single/dual core applications may not utilize the extra cores. While one or two cores are utilized by the applications, the remaining cores may handle fewer tasks and may consume less power. Consequently, the remaining cores that handle fewer tasks may be relatively cooler than the cores utilized by the applications.

In certain configurations, the PCD may be configured with a pre-mitigation temperature threshold, which is lower than the mitigation temperature threshold. When the temperature of a core reaches the pre-mitigation temperature threshold, a scheduler or thermal control module may locate a more efficient or cooler core and may start transferring the jobs or threads of the core reaching the pre-mitigation temperature threshold to the cooler core. The processing frequency of the cooler core may be increased to the required level for processing the jobs or threads. Once the transfer is completed, the core reaching the pre-mitigation temperature threshold may be power collapsed to reduce the temperature. This procedure allows the cores to operate under the mitigation temperature threshold for a longer time, and may lead to a better performance and cooler operating temperatures overall.

FIG. 1 is a functional block diagram 100 illustrating an exemplary embodiment of a UE. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 110 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A UE 110 has, among other components, a processor 112, a memory 114, and a storage 116. The memory 114 is a volatile data storage device such as a RAM. The storage 116 is a non-volatile data storage device such as a flash memory or a solid-state memory device. The storage 116 may be a distributed memory device with separate data stores coupled to the processor 112. The processor 112, the memory 114, the storage 116, and other components of the UE 110 may communicate with each other through a system bus 118. The processor 112 has a plurality of cores. For example, as shown in FIG. 1, the processor 112 has four cores: a first core 122, a second core 124, a third core 126, and a fourth core 128. Each of the cores 122, 124, 126, 128 may be a central processing unit (CPU) core, a graphics processing unit (GPU) core, or a processing unit having other dedicated functions. Each of the cores 122, 124, 126, 128 may have a L1 cache 129. The cores 122, 124, 126, 128 may share a L2 cache 130. In certain configurations, an L1 cache 129 may include three independent caches: an instruction cache to speed up executable instruction fetch, a data cache to speed up data fetch and store, and a translation lookaside buffer (TLB) used to speed up virtual-to-physical address translation for both executable instructions and data. In certain configurations, the cores 122, 124, 126, 128 may belong to the same cluster. In other words, the active cores of the cores 122, 124, 126, 128 may be configured to operate at the same or similar performance level. For example, the active cores of the cores 122, 124, 126, 128 may operate at the same frequency or similar frequencies. In certain configurations, the cores 122, 124, 126, 128 may belong to different clusters.

When processing a load, the cores 122, 124, 126, 128 generate thermal energy (heat). Thermal energy generation may increase when the load is concentrated in a given core of the cores 122, 124, 126, 128, thereby potentially impacting the performance of the UE 110 and/or user experience. Thermal energy generation may be mitigated by reallocation of load across complimentary cores. A thermal control module 140 of the UE 110 may identify, of the cores 122, 124, 126, 128, a core at thermal risk and underutilized cores that are candidates for receipt of the load that may be reallocated from the core at thermal risk.

In certain configurations, the UE 110 has temperature sensors 132, 134, 136, 138 placed proximally to the cores 122, 124, 126, 128, respectively, and monitored by a thermal control module 140. When the thermal control module 140 detects that one of the temperature sensors 132, 134, 136, 138 has measured a temperature in a predetermined relationship with one or more temperature thresholds, the thermal control module 140 may apply one or more thermal mitigation measures to the cores 122, 124, 126, 128 to reduce thermal energy generation within the processor 112.

In certain configurations, the thermal control module 140 may not utilize the temperature sensors 132, 134, 136, 138, but use other available mechanisms, to monitor the temperatures of the cores 122, 124, 126, 128. For example, the thermal control module 140 may use a single temperature sensor that measures the temperature of each of the cores 122, 124, 126, 128 in turn.

In certain configurations, the thermal control module 140 may be implemented as a thermal controller 140-1 on the same die (chip) of the processor 112. The thermal controller 140-1 may communicate with the temperature sensors 132, 134, 136, 138 through a communications link 142. The thermal controller 140-1 may communicate with the processor 112 through a communications link 118. The thermal controller 140-1 may be a finite state machine having multiple states and employing various flip-flops or registers. The thermal controller 140-1 may receive temperature measurements from the temperature sensors 132, 134, 136, 138 as inputs and in response change from one state to another state of the multiple states. In each of the multiple states, the thermal controller 140-1 may perform one or more of the operations described infra referring to FIGS. 4-6.

In certain configurations, the thermal control module 140 may be implemented as a thermal controller 140-1 separate from the processor 112. The thermal controller 140-1 may communicate with the temperature sensors 132, 134, 136, 138 through the communications link 142 (e.g., a management bus). The thermal controller 140-1 may communicate with the processor 112 through the communications link 118 (e.g., a system bus). The thermal controller 140-1 may have its own processing unit and memory.

In certain configurations, the thermal control module 140 may be implemented by a software thermal control module 140-2. The software thermal control module 140-2 may be stored in the storage 116 and loaded into the memory 114 for execution by one of the cores 122, 124, 126, 128.

Figure 2:
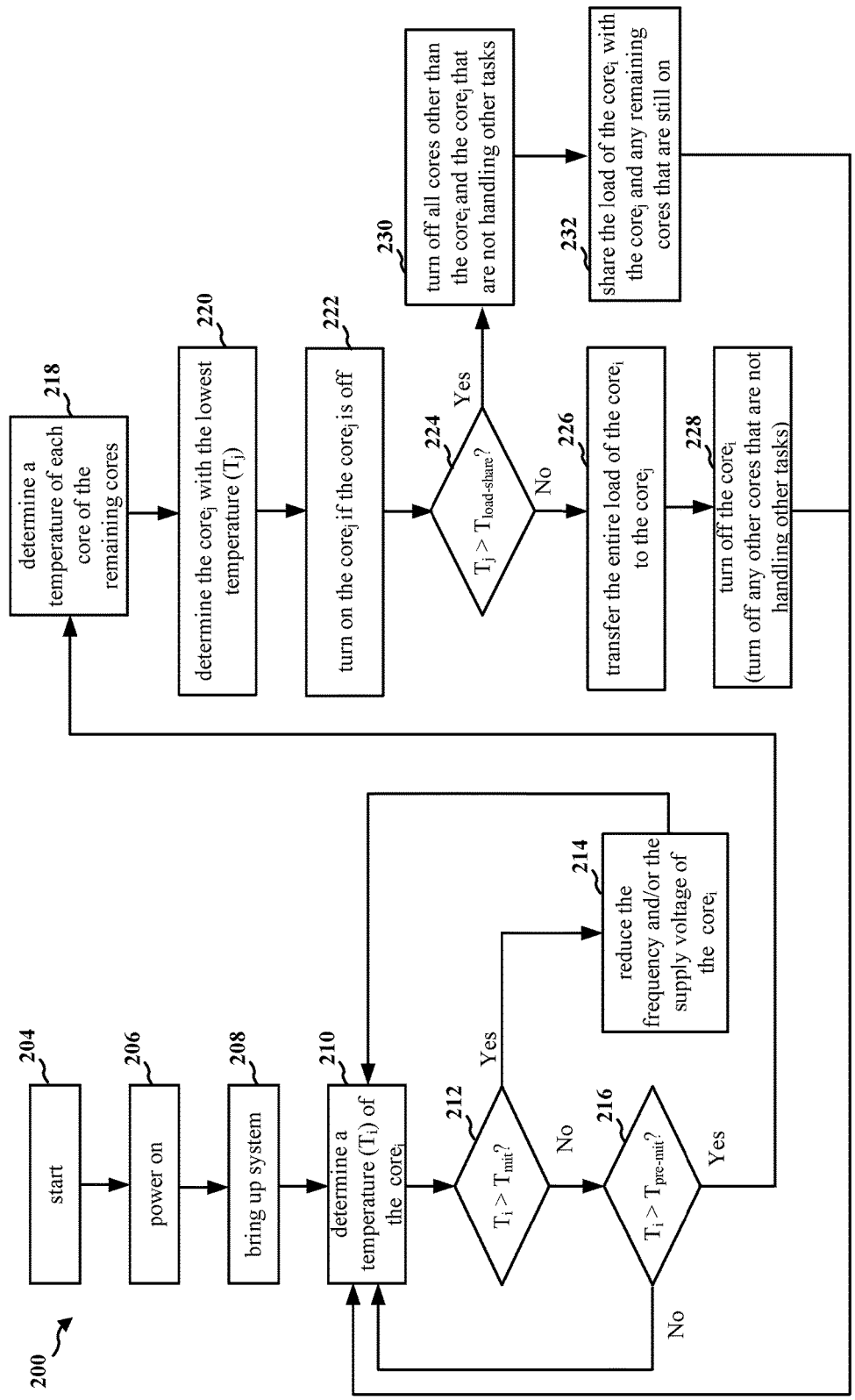
FIG. 2 is a diagram illustrating a thermal mitigation procedure of a UE.

FIG. 2 is a diagram 200 illustrating a thermal mitigation procedure of the UE 110. At operation 204, the procedure of the UE 110 starts. At operation 206, the UE 110 is powered on. At operation 208, the UE 110 brings up the system installed on the UE 110. For example, the storage 116 may store an operating system (OS). The processor 112 may load the necessary components of the OS into the memory 114 and execute those components. In one configuration, the OS may turn on, and allocate one or more tasks to, one or more of the cores 122, 124, 126, 128. The most frequently used data and instructions of a core of the cores 122, 124, 126, 128 may be stored at a corresponding L1 cache 129. Some data that are less frequently used than the data in the L1 cache 129 may be stored at the L2 cache 130. If a core is not allocated a task, that core may be turned off. For example, the core may be power collapsed. That is, power is no longer provided to the core. Alternatively, the core may be clock gated. In this case, power is still provided to the core, but the clock is gated so that it will not toggle. Because the clock is now static due to the gating, the core does not perform processing and, thus, can be considered "off." In addition, the clock of the core may be gated and the voltage supplied to the core may be reduced to a low level that is sufficient to retain data stored in local memories of the core (such as the L1 cache 129) but that is too low for the core to perform processing. Thus, the core can be considered "off." These different ways of turning off the core may lead to different recovery times. In other words, for each method above, turning the core back "on" after it has been turned off may take a different amount of time. Each core that is processing a load (i.e., executing one or more tasks) generates thermal energy. Each core may run at one or more processing frequencies. In certain configurations, the cores 122, 124, 126, 128 may operate at different processing frequencies. In certain configurations, the cores 122, 124, 126, 128 may always operate at the same processing frequency. Further, in this example, the temperature sensors 132, 134, 136, 138 operate to measure the temperatures of the cores 122, 124, 126, 128, respectively.

The thermal control module 140 may be configured with a mitigation temperature threshold ($T_{mit}$), a pre-mitigation temperature threshold ($T_{pre-mit}$), and a load-sharing temperature threshold ($T_{load-share}$). At operation 210, the thermal control module 140 determines the temperature of a core of the cores 122, 124, 126, 128. The thermal control module 140 may communicate with a temperature sensor to receive a temperature ($T_i$) of the core measured at the temperature sensor. In certain configurations, the thermal control module 140 may receive temperatures of all the cores 122, 124, 126, 128 and then select the core having the highest temperature (e.g., the first core 122) to apply a mitigation measure. From now on, the first core 122 may be referenced as an example. Nonetheless, the procedure described may be similarly applied to the other cores of the cores 122, 124, 126, 128. In this example, the thermal control module 140 may receive a temperature of the first core 122 measured at the temperature sensor 132. At operation 212, the thermal control module 140 determines whether the measured temperature is greater than the mitigation temperature threshold (e.g., 90° C.). If the measured temperature is greater than the mitigation temperature threshold, the thermal control module 140 may determine that the first core 122 is at a critical thermal condition. Subsequently, at operation 214, the thermal control module 140 may instruct the first core 122 to reduce the processing frequency and/or to lower the supply voltage of the first core 122 in order to lower the temperature of the first core 122. Subsequently, the procedure returns to operation 210, at which the thermal control module 140 determines the temperature of a next core (e.g., the second core 124).

If at operation 212 the thermal control module 140 determines that the temperature of the first core 122 is not greater than the mitigation temperature threshold, then at operation 216, the thermal control module 140 determines whether the temperature is greater than the pre-mitigation temperature threshold (e.g., 80° C.). If the temperature is not greater than the pre-mitigation temperature threshold, the procedure returns to operation 210, at which the thermal control module 140 determines the temperature of a next core (e.g., the second core 124).

If at operation 216 the thermal control module 140 determines that the temperature of the first core 122 is greater than the mitigation temperature threshold, the thermal control module 140 may consider the first core 122 as a core at thermal risk. At operation 218, the thermal control module 140 communicates with the temperature sensor 134, temperature sensor 136, and temperature sensor 138 to determine the temperatures of the remaining cores (i.e., the second core 124, third core 126, and the fourth core 128). In certain configurations, the cores 122, 124, 126, 128 may belong to the same cluster. That is, the remaining cores are from the same cluster of the first core 122. Accordingly, the thermal control module 140 may use the techniques described infra to select another core in the same cluster and may transfer some or the entire load of the first core 122 to the selected core of the same cluster. In certain configurations, the cores 122, 124, 126, 128 may belong to different clusters. Accordingly, the thermal control module 140 may use the techniques described infra to select, without consideration of the clusters of the cores, another core to transfer some or the entire load of the first core 122. For example, the thermal control module 140 may select a core based on the temperatures of the cores across different clusters. The first core 122 and the third core 126 may belong to a first cluster (e.g., a high performance cluster). The second core 124 and the fourth core 128 may belong to a second cluster (e.g., a low performance cluster). At operation 220, the thermal control module 140 may determine the lowest temperature ($T_J$) as well as the core having the lowest temperature. For example, the second core 124 may be the core having the lowest temperature. At operation 222, the thermal control module 140 turns on the second core 124 (i.e., the core having the lowest temperature) if the second core 124 is not turned on.

At operation 224, the thermal control module 140 determines whether the temperature of the second core 124 is greater than the load-sharing temperature threshold (e.g., 75° C.). If the temperature is not greater than the load-sharing temperature threshold, at operation 226, the thermal control module 140 instructs the first core 122 to transfer the entire load of the first core 122 to the second core 124. In certain configurations, the first core 122 transfers all data and instructions in the L1 cache 129-1 of the first core 122 to the L1 cache 129-2 of the second core 124. Therefore, the second core 124 is able to continue running the tasks that were run on the first core 122. In certain configurations, the second core 124, in response to receiving the transferred load, may increase the processing frequency of the second core 124 in order to process the increased load. Subsequently, at operation 228, the thermal control module 140 turns off or power collapses the first core 122. A running core may generate a leakage current, which in turn generates thermal energy. Turning off a running core may reduce or eliminate the leakage current. In certain configurations, as a further mitigation measure, the thermal control module 140 may detect whether each of the other remaining running cores (i.e., the third core 126 and the fourth core 128) is handling a task and may turn off any core that is not handling a task. Subsequently, the procedure returns to operation 210, at which the thermal control module 140 determines the temperature of a next core.

If during operation 224 the thermal control module 140 determines that the temperature of the second core 124 is greater than the load-sharing temperature threshold, at operation 230, the thermal control module 140 may detect whether each of the other remaining running cores (i.e., the third core 126 and the fourth core 128) is handling a task and may turn off any core that is not handling a task. For example, the thermal control module 140 may detect that the fourth core 128 is not handling any tasks and may turn off the fourth core 128. At operation 232, the thermal control module 140 instructs the first core 122 to share the load of the first core 122 with the all the remaining running cores (i.e., the second core 124 and the third core 126 in this example). The thermal control module 140 may determine a percentage of the load of the first core 122 to be transferred to the second core 124 and the third core 126. The thermal control module 140 may instruct the first core 122 to transfer the corresponding data and instructions stored in the L1 cache 129-1 of the first core 122 to the L1 cache 129-2 of the second core 124 and the L1 cache 129-3 of the third core 126.

In certain configurations, the percentage of the load to be transferred from the first core 122 to the remaining running cores may be determined based on the temperature of the first core 122 and the temperatures of the remaining running cores. Further, the distribution of the transferred load among the remaining running cores may be based on the relative temperature difference between the first core 122 and the remaining running cores. The core having a greater temperature difference from the first core 122 may receive a greater percentage of the load transferred from the first core 122. For example, the first core 122 may be at 85° C., the second core 124 may be at 75° C., the third core 126 may be at 78° C., and the fourth core 128 (which is on) may be at 76° C. Thus, the second core 124 receives a greatest percentage of the load, and the third core 126 receives a lowest percentage of the load. Subsequently, the procedure returns to operation 210, at which the thermal control module 140 determines the temperature of a next core.

Figure 3:
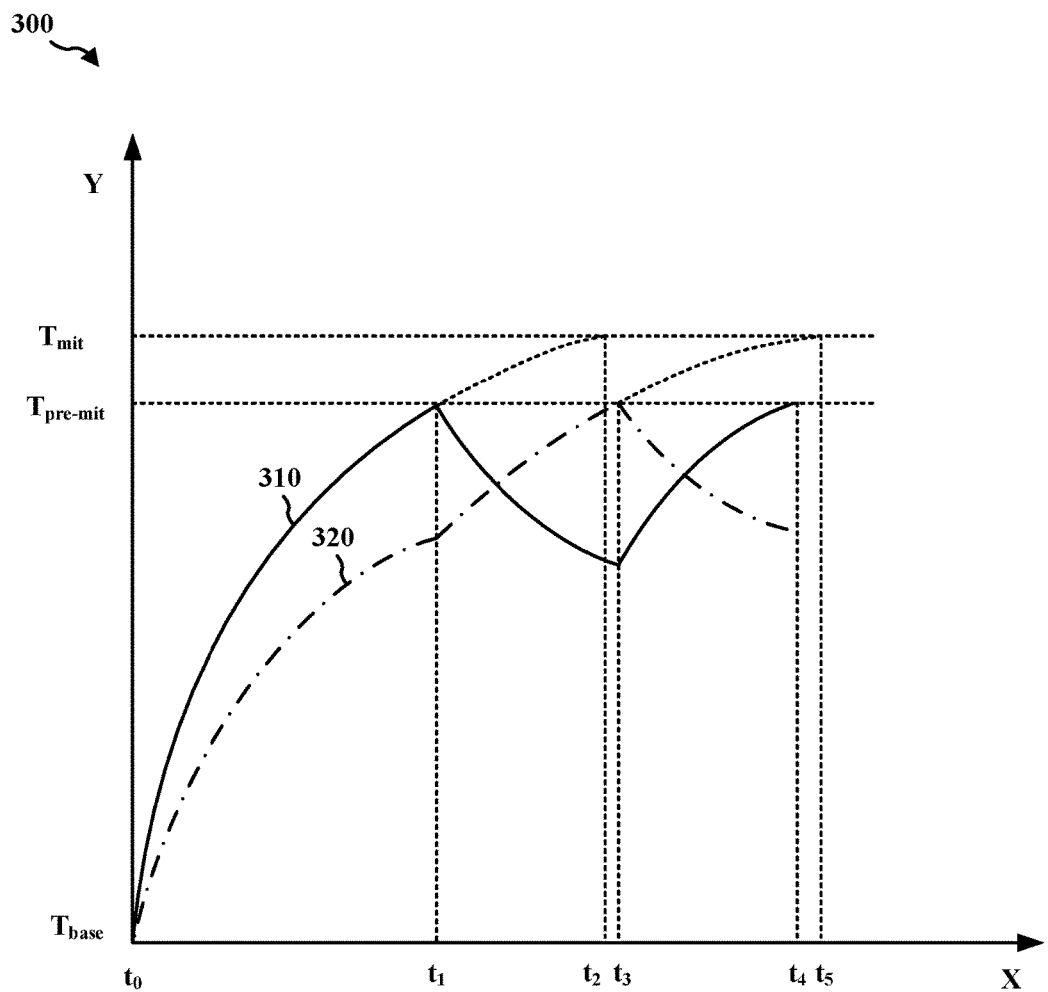
FIG. 3 is a diagram illustrating a temperature increase in a UE.

FIG. 3 is a diagram 300 illustrating a temperature increase in a UE. The X axis is time. The Y axis is temperature. The curve 310 illustrates the temperature changes of the first core 122. The curve 320 illustrates the temperature changes of the second core 124.

At time to, the UE 110 is powered on. The first core 122 and the second core 124 are at a base temperature ($T_{base}$), e.g., a room temperature. The first core 122 may be assigned one or more processing tasks. The second core 124 may be assigned zero or more processing tasks. When the first core 122 is processing a load, the first core 122 generates thermal energy and may reach the pre-mitigation temperature threshold at time $t_1$. Without receiving any mitigation measure, the first core 122 may reach the mitigation temperature threshold at time $t_2$. The second core 124, for example, may process fewer tasks and, thus, at time $t_1$ has a temperature lower than the pre-mitigation temperature threshold. In certain configurations, at time $t_1$ (i.e., upon detecting that the temperature of the first core 122 reached the pre-mitigation temperature threshold), the thermal control module 140 may operate to transfer some or all of the load of the first core 122 to the second core 124. If all of the load of the first core 122 is transferred to the second core 124, the first core 122 may be turned off.

After the load of the first core 122 is transferred to the second core 124, the temperature of the first core 122 may start to reduce. Because after time $t_1$ the second core 124 starts processing the load transferred from the first core 122, the temperature of the second core 124 may increase faster than previously. The temperature of the second core 124 may reach the pre-mitigation temperature threshold at time $t_3$. Without receiving any mitigation measures, the temperature of the second core 124 may reach the mitigation temperature threshold at time $t_5$. From time $t_1$ to time $t_3$, the first core 122 processes less load than previously or no load. Thus, the temperature of the first core 122 reduces and may reach a point that is below the pre-mitigation temperature threshold at time $t_3$. In certain configurations, at time $t_3$ (i.e., upon detecting that the temperature of the second core 124 reached the pre-mitigation temperature threshold and that the temperature of the first core 122 is below the pre-mitigation temperature threshold), the thermal control module 140 may operate to transfer some or all of the load of the second core 124 to the first core 122. Subsequently, the temperature of the first core 122 may start to increase and may reach the pre-mitigation temperature threshold at $t_4$. The temperature of the second core 124 may start to decrease and may reach a point below the pre-mitigation temperature threshold at time $t_4$.

Figure 4:
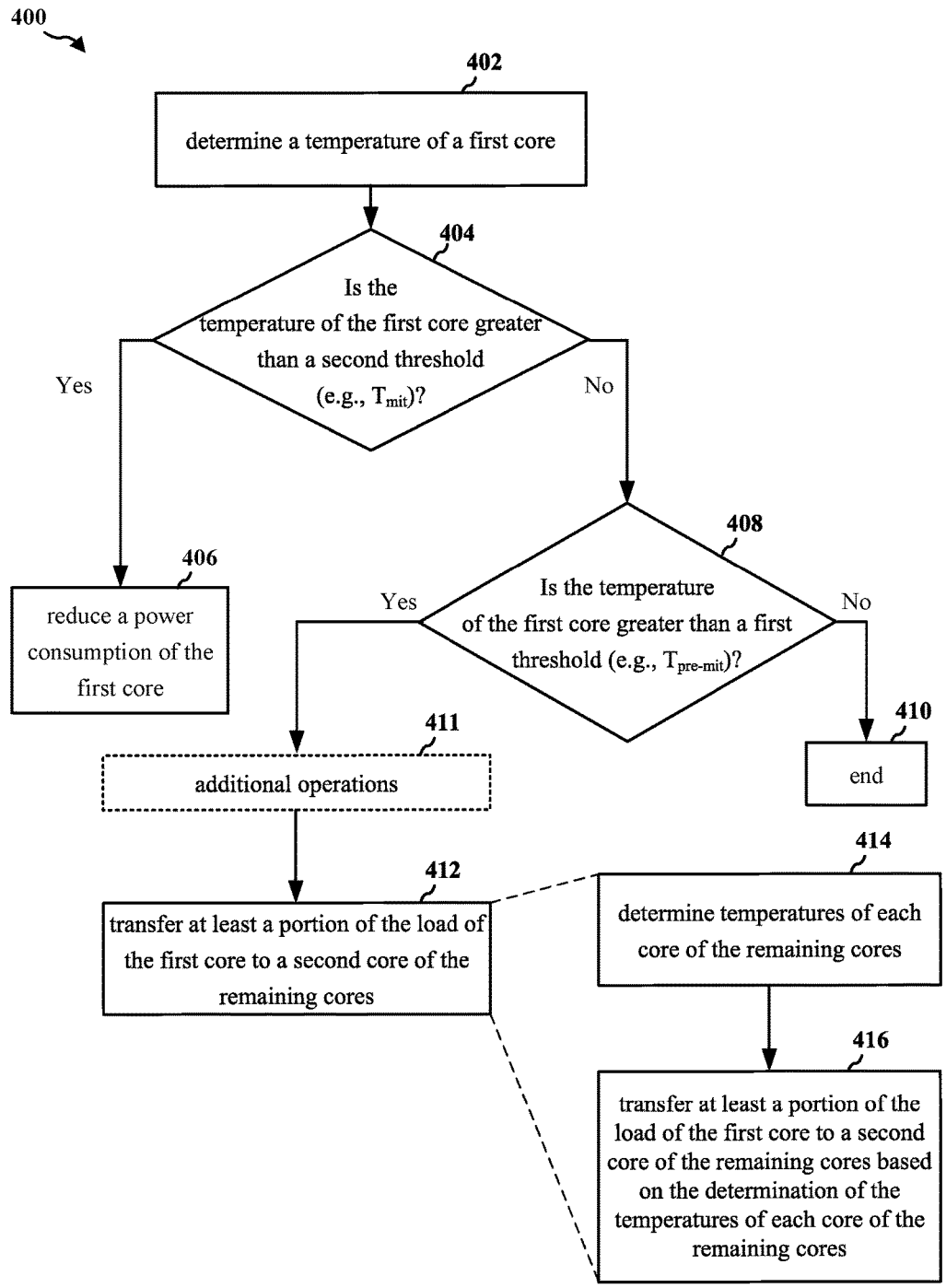
FIG. 4 is a diagram illustrating another thermal mitigation procedure of a UE.

FIG. 4 is a diagram 400 illustrating a thermal mitigation procedure of a UE. The UE (e.g., the UE 110) has a processor (e.g., the processor 112) including a plurality of cores (e.g., the cores 122, 124, 126, 128). The plurality of cores include a first core and remaining cores. The first core processes a load.

At operation 402, the UE determines a temperature of the first core. For example, referring to FIG. 2, the thermal control module 140 may receive a temperature of the first core 122 measured at the temperature sensor 132. At operation 404, the UE may determine whether the temperature of the first core is greater than the second threshold (e.g., the mitigation temperature threshold). If the temperature of the first core is greater than the second threshold, at operation 406, the UE reduces a power consumption of the first core. In certain configurations, to reduce the power consumption of the first core, the UE may at least one of (a) reduce a frequency of the first core, (b) reduce a supply voltage of the first core, (c) power collapse the first core, and (d) transfer all the load of the first code to at least one core of the remaining cores. For example, referring to FIG. 2, at operation 214, the thermal control module 140 may instruct the first core 122 to reduce the processing frequency and/or may lower the supply voltage of the first core 122 in order to lower the temperature of the first core 122.

If during operation 404 the UE determines that the temperature of the first core is not greater than a second threshold, at operation 408, the UE determines whether the temperature of the first core is greater than a first threshold (e.g., the pre-mitigation temperature threshold). The second threshold is greater than the first threshold. If the temperature of the first core is not greater than the first threshold, at operation 410, the procedure ends.

If the temperature of the first core is greater than the first threshold, at operation 412, the UE transfers at least a portion of the load of the first core to a second core of the remaining cores. Additional operations 411 may be performed prior to operation 412. Within operation 412, the UE, at operation 414, may determine temperatures of each core of the remaining cores. Subsequently, at operation 416, the UE transfers the at least a portion of the load of the first core to the second core based on the determination of the temperatures of each core of the remaining cores. For example, referring to FIG. 3, at time ti (i.e., upon detecting that the temperature of the first core 122 reached the pre-mitigation temperature threshold), the thermal control module 140 may operate to transfer some or all of the load of the first core 122 to the second core 124.

Figure 5:
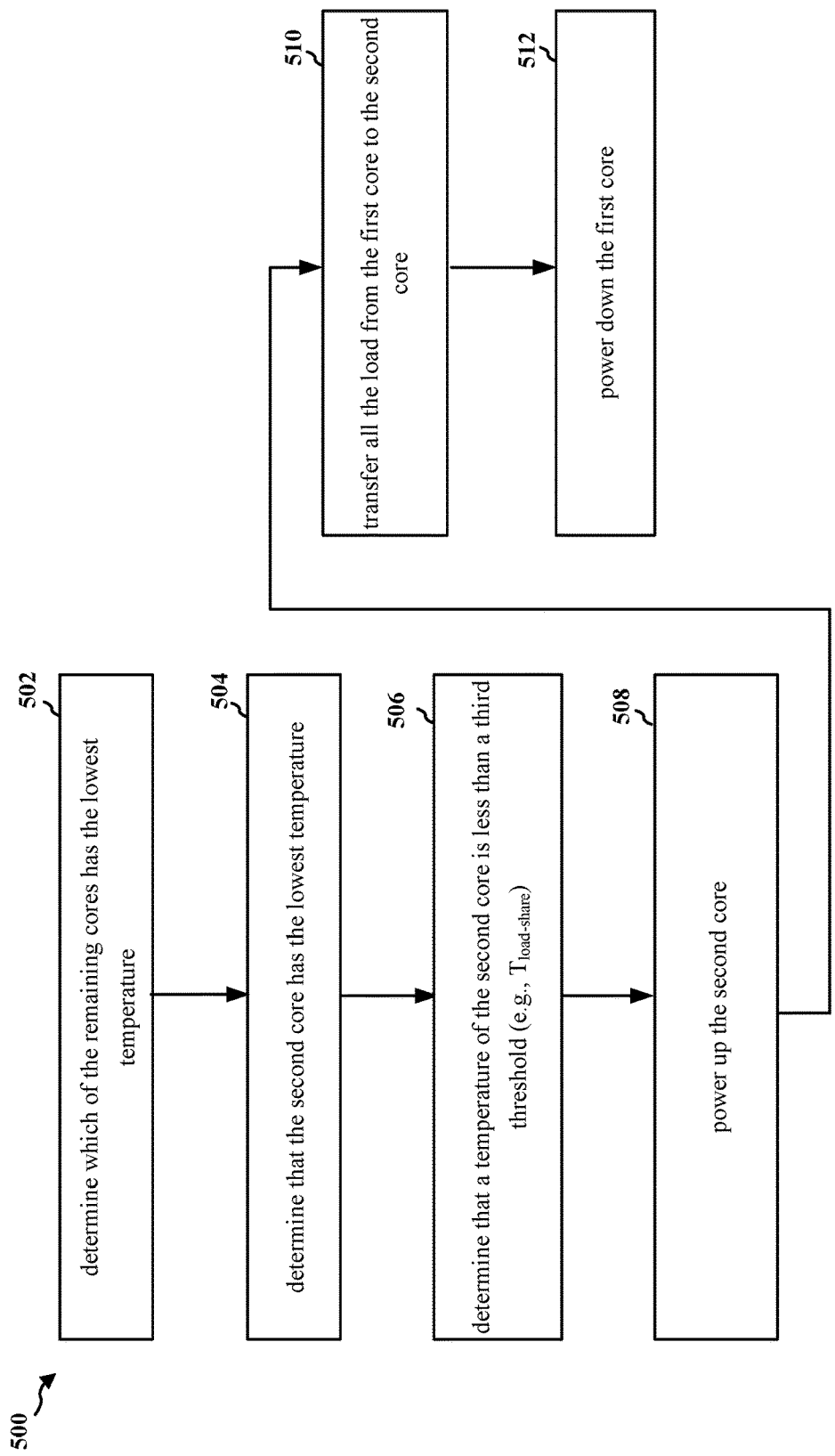
FIG. 5 is a diagram illustrating a thermal mitigation procedure of a UE for transferring a load among cores of a processor.

FIG. 5 is a diagram 500 illustrating a thermal mitigation procedure of a UE for transferring a load among cores of a processor. This procedure follows the operation 408 at operations 411, 412 illustrated in FIG. 4. At operation 502, the UE determines which of the remaining cores has a lowest temperature. For example, referring to FIG. 2, at operation 220, the thermal control module 140 may determine the lowest temperature ($T_j$) as well as the core having the lowest temperature.

At operation 504, the UE determines that the second core has the lowest temperature of the remaining cores. At operation 506, the UE determines that a temperature of the second core is less than a third threshold (e.g., the load-sharing temperature threshold). The third threshold is less than the first threshold (e.g., the pre-mitigation temperature threshold). At operation 508, the UE powers up the second core. For example, referring to FIG. 2, at operation 222, the thermal control module 140 turns on the second core 124 (i.e., the core having the lowest temperature) if the second core 124 is not turned on.

At operation 510, the UE transfers all the load of the first core to the second core. For example, referring to FIG. 2, at operation 226, the first core 122 transfers all data and instructions in the L1 cache 129-1 of the first core 122 to the L1 cache 129-2 of the second core 124. At operation 512, the UE powers down the first core. For example, referring to FIG. 2, at operation 228, the thermal control module 140 turns off or power collapse the first core 122.

FIG. 6 is a diagram 600 illustrating a thermal mitigation procedure of a UE for sharing a load among cores of a processor. This procedure follows the operation 408 at operations 411, 412 illustrated in FIG. 4. At operation 602, the UE determines that each core of the remaining cores has a temperature greater than a third threshold (e.g., the load-sharing temperature threshold). The third threshold is less than the first threshold (e.g., the pre-mitigation temperature threshold). At operation 604, the UE determines portions of the load to transfer to each core of the remaining cores based on a relative temperature difference of each core. For example, referring to FIG. 2, at operation 232, the percentage of the load to be transferred from the first core 122 to the remaining running cores may be determined based on the temperature of the first core 122 and the temperatures of the remaining running cores. Further, the distribution of the transferred load among the remaining running cores may be based on the relative temperature difference between the first core 122 and the remaining running cores. At operation 606, the UE transfers a remaining portion of the load to a set of cores of the remaining cores to share the load between the second core and the set of cores. For example, referring to FIG. 2, at operation 232, the thermal control module 140 may instruct the first core 122 to transfer the corresponding data and instructions stored in the L1 cache 129-1 of the first core 122 to the L1 cache 129-2 of the second core 124 and the L1 cache 129-3 of the third core 126.

In one configuration, an apparatus is provided for interfacing with a processor including a plurality of cores. The plurality of cores include a first core and remaining cores. The apparatus includes means for determining a temperature of the first core of the plurality of cores. The first core processes a load. The apparatus further includes means for determining that the temperature of the first core is greater than a first threshold. The apparatus further includes means for determining that the temperature of the first core is not greater than a second threshold. The second threshold is greater than the first threshold. The apparatus further includes means for transferring at least a portion of the load of the first core to a second core of the remaining cores in response to determining that the temperature of the first core is greater than the first threshold. The apparatus may further include means for determining temperatures of each core of the remaining cores. The at least the portion of the load of the first core may be transferred to the second core based on the determination of the temperatures of each core of the remaining cores. The apparatus may further include means for determining which of the remaining cores has a lowest temperature. The at least the portion of the load may be transferred to the second core in response to determining that the second core has the lowest temperature of the remaining cores. In one configuration, the at least a portion of the load is all the load, and all the load is transferred from the first core to the second core in response to determining that the second core has the lowest temperature of the remaining cores. The apparatus may further include means for determining that a temperature of the second core is less than a third threshold. The third threshold is less than the first threshold. All the load may be transferred to the second core in response to determining that the second core has a temperature less than the third threshold. The apparatus may further include means for powering up the second core before transferring all the load from the first core to the second core, and means for powering down the first core in response to transferring all the load from the first core to the second core. The apparatus may further include means for determining that each core of the remaining cores has a temperature greater than a third threshold, the third threshold being less than the first threshold, and means for transferring a remaining portion of the load to a set of cores of the remaining cores to share the load between the second core and the set of cores. The apparatus may further include means for determining a respective temperature difference of the respective temperature of each of the remaining cores from the temperature of the first core. The means for transferring is configured to share the load of the first core among the remaining cores based on the respective temperature differences of the remaining cores. The means for transferring may be configured to transfer the at least a portion of the load further in response to determining that the temperature of the first core is not greater than the second threshold. The apparatus may further include means for determining a second temperature of the first core of the plurality of cores. The apparatus may further include means for determining that the second temperature of the first core is greater than the second threshold. The apparatus may further include means for reducing a power consumption of the first core in response to determining that the second temperature of the first core is greater than the second threshold. To reduce the power consumption of the first core, the means for reducing the power consumption is configured to at least one of (a) reduce a frequency of the first core, (b) reduce a supply voltage of the first core, (c) power collapse the first core, and (d) transfer all the load of the first code to at least one core of the remaining cores. The aforementioned means may be the thermal control module 140-1 configured to perform the functions corresponding to each of the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of operating of a user equipment (UE), the UE having a processor including a plurality of cores, the plurality of cores including a first core processing a load and remaining cores, comprising:
    determining that a temperature of the first core is greater than a first threshold;
    determining a temperature of a second core of the remaining cores in response to determining that the temperature of the first core is greater than the first threshold;
    determining whether the temperature of the second core is greater than or less than a second threshold, the second threshold being less than the first threshold;
    transferring at least a portion of the load of the first core to the second core in response to determining that the temperature of the first core is greater than the first threshold, the transfer of the at least the portion of the load being based on whether the temperature of the second core is greater than or less than the second threshold;
    determining whether each core of the remaining cores has a temperature greater than the second threshold; and
    transferring a remaining portion of the load to a set of cores of the remaining cores to share the load between the second core and the set of cores upon determining that each core of the remaining cores has the temperature greater than the second threshold.

2. The method of claim 1, further comprising determining to transfer all the load to the second core in response to determining that the second core has a temperature less than the second threshold, the at least a portion of the load being all the load.

3. The method of claim 1, further comprising determining temperatures of each core of the remaining cores, wherein the at least the portion of the load of the first core is transferred to the second core based on the determination of the temperatures of each core of the remaining cores.

4. The method of claim 3, further comprising determining which of the remaining cores has a lowest temperature, wherein the at least the portion of the load is transferred to the second core in response to determining that the second core has the lowest temperature of the remaining cores.

5. The method of claim 4, wherein the at least a portion of the load is all the load, and all the load is transferred from the first core to the second core in response to determining that the second core has the lowest temperature of the remaining cores.

6. The method of claim 5, further comprising:
    powering up the second core before transferring all the load from the first core to the second core; and
    powering down the first core in response to transferring all the load from the first core to the second core.

7. The method of claim 1, further comprising determining a respective temperature difference between the temperature of each of the remaining cores and the temperature of the first core, wherein the load of the first core is shared among the remaining cores based on the respective temperature differences of the remaining cores.

8. The method of claim 1, wherein the at least a portion of the load is transferred further in response to determining that the temperature of the first core is less than a third threshold, the third threshold being greater than the first threshold, the method further comprising:
    determining a second temperature of the first core;
    determining that the second temperature of the first core is greater than the third threshold; and
    reducing a power consumption of the first core in response to determining that the second temperature of the first core is greater than the third threshold.

9. The method of claim 8, wherein the reducing the power consumption of the first core includes at least one of:
    reducing a frequency of the first core;
    reducing a supply voltage of the first core;
    power collapsing the first core; or
    transferring all the load of the first core to at least one core of the remaining cores.

10. A thermal control module for managing thermal energy of a processor including a plurality of cores, the plurality of cores including a first core processing a load and remaining cores, comprising:
　means for determining that a temperature of the first core is greater than a first threshold;
　means for determining a temperature of a second core of the remaining cores in response to determining that the temperature of the first core is greater than the first threshold;
　means for determining whether the temperature of the second core is greater than or less than a second threshold, the second threshold being less than the first threshold;
　means for transferring at least a portion of the load of the first core to the second core in response to determining that the temperature of the first core is greater than the first threshold, the transfer of the at least the portion of the load being based on whether the temperature of the second core is greater than or less than the second threshold;
　means for determining whether each core of the remaining cores has a temperature greater than the second threshold; and
　means for transferring a remaining portion of the load to a set of cores of the remaining cores to share the load between the second core and the set of cores upon determining that each core of the remaining cores has the temperature greater than the second threshold.

11. The thermal control module of claim 10, further comprising means for determining to transfer all the load to the second core in response to determining that the second core has a temperature less than the second threshold, the at least a portion of the load being all the load.

12. The thermal control module of claim 10, further comprising means for determining temperatures of each core of the remaining cores, wherein the at least the portion of the load of the first core is transferred to the second core based on the determination of the temperatures of each core of the remaining cores.

13. The thermal control module of claim 12, further comprising means for determining which of the remaining cores has a lowest temperature, wherein the at least the portion of the load is transferred to the second core in response to determining that the second core has the lowest temperature of the remaining cores.

14. The thermal control module of claim 13, wherein the at least a portion of the load is all the load, and all the load is transferred from the first core to the second core in response to determining that the second core has the lowest temperature of the remaining cores.

15. The thermal control module of claim 14, further comprising:
　means for powering up the second core before transferring all the load from the first core to the second core; and
　means for powering down the first core in response to transferring all the load from the first core to the second core.

16. The thermal control module of claim 10, further comprising means for determining a respective temperature difference between the temperature of each of the remaining cores and the temperature of the first core, wherein the means for transferring is configured to share the load of the first core among the remaining cores based on the respective temperature differences of the remaining cores.

17. The thermal control module of claim 10, wherein the at least a portion of the load is transferred further in response to determining that the temperature of the first core is less than a third threshold, the third threshold being greater than the first threshold, the thermal control module further comprising:
　means for determining a second temperature of the first core;
　means for determining that the second temperature of the first core is greater than the third threshold; and
　means for reducing a power consumption of the first core in response to determining that the second temperature of the first core is greater than the third threshold.

18. The thermal control module of claim 17, wherein the means for reducing the power consumption of the first core is configured to reduce the power of the first core by at least one of:
　reducing a frequency of the first core;
　reducing a supply voltage of the first core;
　power collapsing the first core; or
　transferring all the load of the first core to at least one core of the remaining cores.

19. A thermal control module for managing thermal energy of a processor including a plurality of cores, the plurality of cores including a first core processing a load and remaining cores, comprising:
　circuitry in electrical communication with a temperature sensor, wherein the circuitry is configured to:
　determine that a temperature of the first core is greater than a first threshold;
　determine a temperature of a second core of the remaining cores in response to determining that the temperature of the first core is greater than the first threshold;
　determine whether the temperature of the second core is greater than or less than a second threshold, the second threshold being less than the first threshold;
　transfer at least a portion of the load of the first core to the second core in response to determining that the temperature of the first core is greater than the first threshold, the transfer of the at least the portion of the load being based on whether the temperature of the second core is greater than or less than the second threshold;
　determine whether each core of the remaining cores has a temperature greater than the second threshold; and
　transfer a remaining portion of the load to a set of cores of the remaining cores to share the load between the second core and the set of cores upon determining that each core of the remaining cores has the temperature greater than the second threshold.

20. The thermal control module of claim 19, wherein the circuitry is further configured to determine to transfer all the load to the second core in response to determining that the second core has a temperature less than the second threshold, the at least a portion of the load being all the load.

21. The thermal control module of claim 19, wherein the circuitry is further configured to determine temperatures of each core of the remaining cores, wherein the at least the portion of the load of the first core is transferred to the second core based on the determination of the temperatures of each core of the remaining cores.

22. The thermal control module of claim 21, wherein the circuitry is further configured to determine which of the remaining cores has a lowest temperature, and the at least the portion of the load is transferred to the second core in response to determining that the second core has the lowest temperature of the remaining cores.

23. The thermal control module of claim 22, wherein the at least a portion of the load is all the load, and all the load is transferred from the first core to the second core in response to determining that the second core has the lowest temperature of the remaining cores.

24. The thermal control module of claim 23, wherein the circuitry is further configured to:
power up the second core before transferring all the load from the first core to the second core; and
power down the first core in response to transferring all the load from the first core to the second core.

25. The thermal control module of claim 23, wherein the circuitry is further configured to determine a respective temperature difference between the temperature of each of the remaining cores and the temperature of the first core, and the load of the first core is shared among the remaining cores based on the respective temperature differences of the remaining cores.

26. The thermal control module of claim 19, wherein the at least a portion of the load is transferred further in response to determining that the temperature of the first core is less than a third threshold, the third threshold being greater than the first threshold, wherein the circuitry is further configured to:
determine a second temperature of the first core;
determine that the second temperature of the first core is greater than the third threshold; and
reduce a power consumption of the first core in response to determining that the second temperature of the first core is greater than the third threshold.

27. The thermal control module of claim 26, wherein the circuitry is configured to reduce the power consumption of the first core by at least one of:
reducing a frequency of the first core;
reducing a supply voltage of the first core;
power collapsing the first core; or
transferring all the load of the first core to at least one core of the remaining cores.

28. A non-transitory computer-readable medium storing computer executable code for interfacing with a processor including a plurality of cores, the plurality of cores including a first core processing a load and remaining cores, the computer-readable medium comprising code to:
determine that a temperature of the first core is greater than a first threshold;
determine a temperature of a second core of the remaining cores in response to determining that the temperature of the first core is greater than the first threshold;
determine whether the temperature of the second core is greater than or less than a second threshold, the second threshold being less than the first threshold;
transfer at least a portion of the load of the first core to the second core in response to determining that the temperature of the first core is greater than the first threshold, the transfer of the at least the portion of the load being based on whether the temperature of the second core is greater than or less than the second threshold;
determine whether each core of the remaining cores has a temperature greater than the second threshold; and
transfer a remaining portion of the load to a set of cores of the remaining cores to share the load between the second core and the set of cores upon determining that each core of the remaining cores has the temperature greater than the second threshold.

* * * * *